US 6,625,406 B2

(12) United States Patent
Suzuki et al.

(10) Patent No.: US 6,625,406 B2
(45) Date of Patent: Sep. 23, 2003

(54) IMAGE FORMING SYSTEM WHEREIN AN IMAGE INPUT TO ONE OF THE PLURALITY OF IMAGE FORMING APPARATUS IS OUTPUT BY THE PLURALITY OF IMAGE FORMING APPARATUS

(75) Inventors: Chikatsu Suzuki, Tokyo (JP); Junji Sato, Tokyo (JP); Akio Ueda, Tokyo (JP); Yoshihisa Kamata, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/951,118

(22) Filed: Sep. 13, 2001

(65) Prior Publication Data

US 2002/0031364 A1 Mar. 14, 2002

(30) Foreign Application Priority Data

Sep. 14, 2000 (JP) ........................................ 2000-279516
Sep. 14, 2000 (JP) ........................................ 2000-280111

(51) Int. Cl.⁷ ............................................... G03G 15/00
(52) U.S. Cl. ............................ 399/75; 399/77; 399/81; 399/85
(58) Field of Search .......................... 399/8, 75, 76, 399/77, 79, 81, 82, 83, 85; 358/296, 501

(56) References Cited

U.S. PATENT DOCUMENTS

| | | | | |
|---|---|---|---|---|
| 4,774,524 A | * | 9/1988 | Warbus et al. | 358/296 X |
| 5,596,416 A | * | 1/1997 | Barry et al. | 358/296 |
| 5,642,208 A | * | 6/1997 | Takahashi et al. | 358/501 |
| 6,192,202 B1 | * | 2/2001 | Doi | 399/8 |

FOREIGN PATENT DOCUMENTS

| | | | |
|---|---|---|---|
| JP | 08-251319 | * | 9/1996 |
| JP | 09-055820 | | 2/1997 |
| JP | 2000-151892 | * | 5/2000 |

* cited by examiner

Primary Examiner—Hoan Tran
(74) Attorney, Agent, or Firm—Frishauf, Holtz, Goodman & Chick, P.C.

(57) ABSTRACT

An image forming system for connecting a plurality of image forming apparatus and which is capable of conducting a tandem operation such that an image input by one of the plurality of image forming apparatus is output by the plurality of image forming apparatus and which includes job reserving sections provided on each of the image forming apparatus, for reserving an image forming job, wherein while conducting the tandem operation, any of the job reserving sections on the image forming apparatus is capable of reserving a job.

38 Claims, 5 Drawing Sheets

PRIOR ART

| NO | MODE | CONDITION | COPIED QUANTITY | REMAINING SHEETS | REMAINING TIME (MINUTE) |
|---|---|---|---|---|---|
| 1 | TANDEM | UNDER OUTPUTTING | 230 | 270 | 5.4 |
| 2 | RESERVATION | WAIT | 000 | | |

JOB CONTROL DISPLAY

NO PAPER IN COPYING MACHINE B

IMAGE FORMING SYSTEM WHEREIN AN IMAGE INPUT TO ONE OF THE PLURALITY OF IMAGE FORMING APPARATUS IS OUTPUT BY THE PLURALITY OF IMAGE FORMING APPARATUS

BACKGROUND OF THE INVENTION

The present invention relates to an image forming apparatus, and more particularly to an image forming apparatus in which a plurality of main bodies of the image forming apparatus are connected to each other and the image formation is performed on the recording materials from image data by a plurality of the main bodies of the image forming apparatus.

A conventional tandem type image forming apparatus is, for example, proposed in TOKUGANHEI No. 7-204493, and is in practical use in the name of the copying machine "KONICA 7060" (the registered trade mark), as a copying machine representing an example of the image forming apparatus. The tandem type image forming apparatus is highly estimated in terms of usefulness as a copying machine having high speed copying power, and it is expected to have various uses in the future, because a plurality of the copying machines (the main bodies of the image forming apparatus) perform copying simultaneously.

Figure 4:
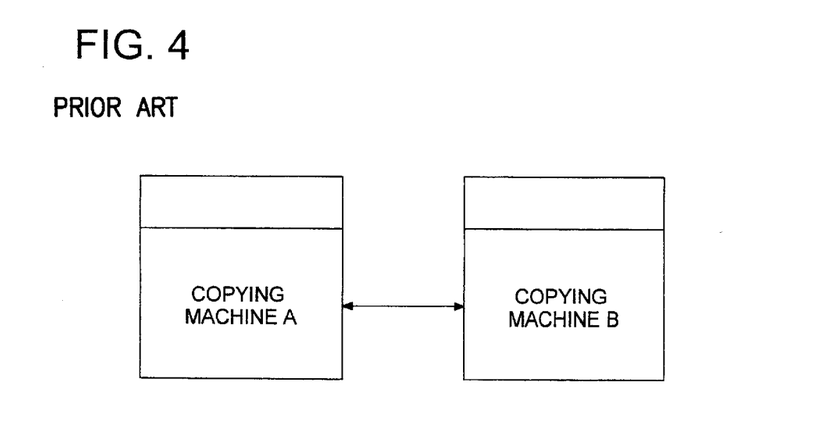
FIG. 4 is a drawing showing the conventional tandem type image forming apparatus.

As shown in FIG. 4, when a plurality of the copying machines A and B perform the tandem movement to make one hundred sets of copies from ten sheets of the documents, for example, ten sheets of the documents are set on the copying machine A which reads the image, a tandem mode (the mode of performing the tandem movement) is designated on an operation panel, the numeral one hundred as the number of the sets of copies is set, and a copy button is pressed, then, in this case, the image data obtained through reading of ten sheets of the documents are stored in both of image memories via selectors.

Further for example, a copy quantity is, automatically allocated to the copying machines A and B so that 50 sets may be allocated to each of them, then each copying machine copy them, and as a result, it becomes possible to copy two times faster than the case of the single copying machine.

Figure 5:
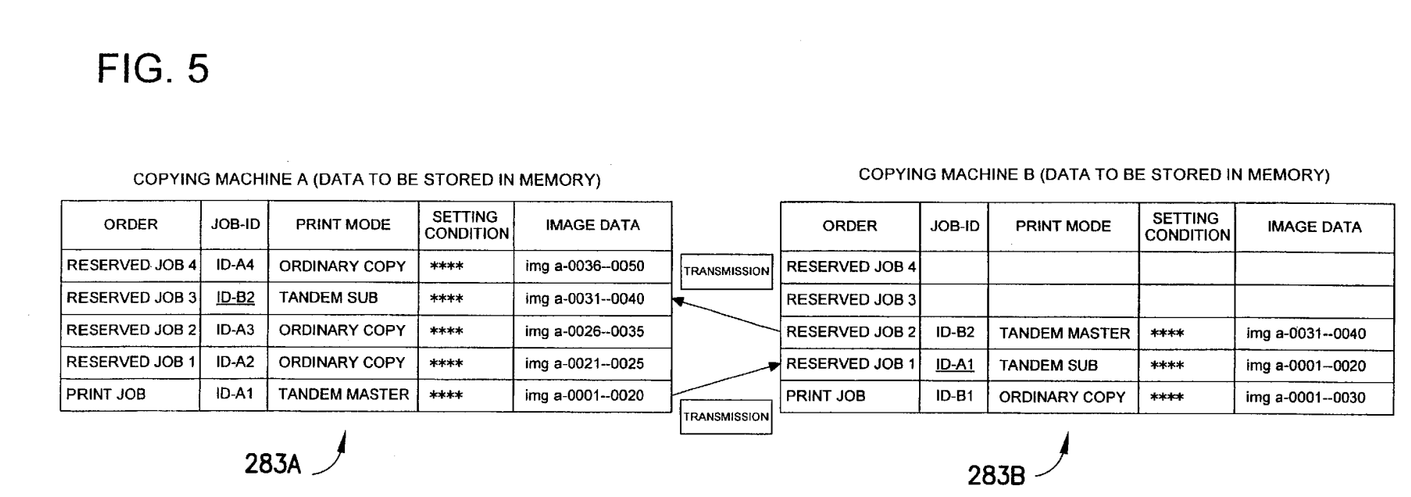
FIG. 5 is a drawing showing a file to store the reserved jobs in the memories of the copying machines A and B.

However, in the prior tandem type image forming apparatus, as shown in display panels of 283A and 283B in FIG. 5, the copying machine A which reads the image becomes a master machine, and a reservation is also inputted on the master machine. In this case, even when image forming apparatus are installed at a plurality of places in a office, the reservation cannot be done on the copying machine B, and a user must move to the other place to reserve a copying job. If the user wants to reserve on the copying machine B, the user must wait until the copying machine A finishes its work.

Conventionally, for the job reservation, it is impossible to intermingle a tandem job which outputs from a plurality of copying machines and a single job which outputs from the one copying machine, and all the reservations during the tandem job are reserved as a tandem job. In such a reservation manner, it is very inconvenient, when the output in terms of the number of copies is very small, or when the user wants to avoid gathering the copies which are outputted from a plurality of the copying machines for one job. If the user wants to reserve on the copying machine B, the user must wait until the copying machine A finishes its work.

Conventionally, for the job reservation, it is impossible to intermingle a tandem job which outputs from a plurality of the copying machines and a single job which outputs from the one copying machine, and all the reservations during the tandem job are reserved as a tandem job. In such a reservation manner, it is very inconvenient, when the output in terms of the number of copies is very small, or when the user want to avoid gathering the copies which are outputted from a plurality of the copying machines for one job.

Therefore, an object of the invention is to provide an image forming apparatus wherein the job can be reserved from every main body of the image forming apparatus so that convenience is improved for the job reservation.

In the tandem type copying machine in the past, there are some copying machines wherein each copying machine works independently after the first job allocation, and no further allocation of the job is made again.

Further, there are some copying machines wherein when one of the copying machines complete its job, job allocation is made only once, and then, the tandem mode is cleared, and each copying machine works independently. With regard to the job allocation which is made only once, all of the remaining numbers of the output are allocated to the machine which finished its job in case of the occurrence of an error which disables operation requiring a service person call in the other machine, 50% of the remaining numbers of the output are allocated in case the other machine is in stopped operation, and 50% of the remaining numbers of the output are allocated in case the other machine is in outputting operation.

When the re-allocation is not performed like in the past, or when the one time re-allocation is performed, if the stop of the copying machine such as that for no paper repeatedly happens twice or more, it was impossible to obtain the desire number of copies until the problem was corrected.

Further, in the prior copying machine, if the accident happens once and the re-allocation is performed, the tandem mode is cleared and the copying machine works independently, accordingly, when the error of disable operation requiring a service person call happens, the image data are lost by the power-off operation, and as a result, it becomes impossible to obtain the output of all the number of the copies.

Accordingly, it is an object of the invention to provide an image forming apparatus which is able to obtain the output result in the shortest time in accordance with the condition, to increase the productivity and to improve the reliability.

SUMMARY OF THE INVENTION

For solving the problem stated above and attaining the object, the invention is constructed as the following structures:

An image forming system for connecting a plurality of image forming apparatus and being capable of conducting a tandem operation such that an image inputted by one of the plurality of image forming apparatus is outputted by the plurality of image forming apparatus, the system comprises; job reserving sections provided on each of the image forming apparatus, for reserving an image forming job, wherein while conducting said tandem operation, any of the job reserving sections on said image forming apparatus is capable of reserving a job.

Further, the above object may be attained by the following preferable structures.

(Structure 1) An image forming apparatus in which a plurality of the main bodies of the image forming apparatus are electrically connected each other, and the image inputted from the one set of the main body of the image forming apparatus can be outputted from a plurality of the main bodies of the image forming apparatus, wherein a job can be reserved while the job to output from a plurality of the main bodies of the image forming apparatus is conducted, and there is provided a control means which makes any of the job to output from a plurality of the main bodies of the image forming apparatus and the job to output from the one set of the main body of the image forming apparatus to be possible.

According to (Structure 1), intermingled jobs can be reserved, while the job is in operation to output from a plurality of the main bodies of the image forming apparatus, and the job is freely selected without being restricted by carrying out of the job operating previously, a degree of freedom for use is high and production efficiency is improved.

(Structure 2) An image forming apparatus in which a plurality of the main bodies of the image forming apparatus are electrically connected each other, and the image inputted from the one set of the main body of the image forming apparatus can be outputted from a plurality of the main bodies of the image forming apparatus, wherein a job can be reserved while the job to output from the one set of the main body of the image forming apparatus is conducted, and there is provided a control means which makes any of both the job to output from a plurality of the main bodies of the image forming apparatus and the job to output from the one set of the main body of the image forming apparatus to be possible.

According to (Structure 2), intermingled jobs can be reserved, while the job to output from the one set of the main body of the image forming apparatus is conducted, and the job is freely selected without being restricted by carrying out of the job operating previously, a degree of freedom in use is high and production efficiency is improved.

(Structure 3) An image forming apparatus in which a plurality of the main bodies of the image forming apparatus are electrically connected each other, and the image inputted from the one set of the main body of the image forming apparatus can be outputted from a plurality of the main bodies of the image forming apparatus, wherein a job can be reserved while the job to output from a plurality of the main bodies of the image forming apparatus is conducted, and there is provided a control means which makes it possible for all of the main bodies of the image forming apparatus connected to reserve the job.

According to (Structure 3), the jobs can be reserved from every connected main body of the image forming apparatus, while the job to output from a plurality of the main bodies of the image forming apparatus is conducted, and the job is freely reserved without being restricted by the main bodies of the image forming apparatus operating previously, a degree of freedom for use is high and production efficiency is improved.

(Structure 4) The image forming apparatus stated in (Structure 3), wherein that the above-mentioned job reservation can be performed for both the job to output from a plurality of the main bodies of the image forming apparatus and the job to output from the one set of the main body of the image forming apparatus.

According to (Structure 4), the job reservation can be performed for both the job to output from a plurality of the main bodies of the image forming apparatus and the job to output from one set of the main body of the image forming apparatus, a degree of freedom for use is high and production efficiency is improved.

(Structure 5) An image forming apparatus in which a plurality of the main bodies of the image forming apparatus are electrically connected each other, and the image inputted from the one set of the main body of the image forming apparatus can be outputted from a plurality of the main bodies of the image forming apparatus, wherein there is provided a control means which makes it possible, while conducting a job to output from the one set of the main body of the image forming apparatus, to reserve a job from the other main body of the image forming apparatus.

According to (Structure 5), a job can be reserved from the other main body of the image forming apparatus, while the job to output from the one set of the main body of the image forming apparatus is conducted, and the job can be freely reserved, without being districted by the job reservation from the main body of the image forming apparatus which is in operation of the job, a degree of freedom for use is high and production efficiency is improved.

(Structure 6) The image forming apparatus stated in (Structure 5) wherein the above-mentioned job reservation can be performed for both the job that outputs from a plurality of the main bodies of the image forming apparatus and the job that outputs from the one set of the main body of the image forming apparatus.

According to (Structure 6), in addition to (structure 5), the intermingled reservation of jobs is acceptable, a degree of freedom for use is high and production efficiency is improved.

(Structure 7) The image forming apparatus stated in either one of the Structures 1–6, wherein the above-mentioned job reservation can be performed for both the job which outputs from the main body of the image forming apparatus representing the copying machine that can output the image inputted from an external apparatus, and the job which outputs from the main body of the image forming apparatus representing a printer.

According to (Structure 7), in addition to the Structures 1–6, the job reservation can be performed for both the job which outputs from the copying machine that can output the image that is inputted from the external apparatus, and the job which outputs from the printer, and the structure can be used for various kinds of the apparatus, a degree of freedom for use is high and production efficiency is improved.

(Structure 8) The image forming apparatus stated in either one of the Structures 1–6, wherein, when the above-mentioned job is the one that outputs from the main body of the image forming apparatus representing the printer, the job must be limited to the one that outputs from the one set of the main body of the image forming apparatus.

According to (Structure 8), in addition to the Structures 1–6, in case of the job which outputs from the printer, the job is limited to the job which outputs from the one set of the main body of the image forming apparatus.

(Structure 9) An image forming apparatus in which, a plurality of the main bodies of the image forming apparatus are electrically connected each other, and the output number for the image inputted from one set of the main body of the image forming apparatus is allocated and sent so that a plurality of the main bodies of the image forming apparatus can output, wherein, at the end of the job that outputs from one set of the main body of the image forming apparatus based on the above-mentioned allocation of the output number of the copies, if there remains the output number of the images on the other image forming apparatus main bodies, there is provided a control means which transmits the remaining output number to the above-mentioned one set of the main body of the image forming apparatus which again performs the allocation of the remaining output number in accordance with circumstances, and performs the re-allocation until all of the remaining output numbers are completely outputted.

According to (Structure 9), at the end of the job that outputs from the one set of the main body of the image forming apparatus, based on the above-mentioned allocation of the output number of the copies, if there remains the output number in the other main body of the image forming apparatus, the remaining output number is transmitted to the above-mentioned one set of the main body of the image forming apparatus, and allocation of the output number is conducted until all of the remaining output numbers are completely outputted. Thus, it is possible to obtain output results in the shortest time in accordance with the condition, and the productivity is improved and the reliability can also be improved.

(Structure 10) The image forming apparatus stated in (Structure 9), wherein, while the output is in operation as the above-mentioned conditions, the remaining output number is allocated equally to a plurality of the main bodies of the image forming apparatus to be sent.

According to (Structure 10), while the output is in operation, the remaining output number is allocated equally to a plurality of the main bodies of the image forming apparatus to be sent for output, and thus, it is possible to obtain the output results within a shortest period of time.

(Structure 11) The image forming apparatus stated in (Structure 9) wherein, while the apparatus is disable of operations as the above-mentioned conditions, the whole of the remaining output number is allocated equally to a plurality of main bodies of other image forming apparatus.

According to (Structure 11), while the apparatus is disable of operations, all the remaining output numbers are allocated equally to a plurality of the main bodies of the other image forming apparatus, therefore, the copies of all the preset numbers are obtained, even if the service person calling error happens after the abnormal condition occurs.

(Structure 12) The image forming apparatus stated in (Structure 9) wherein, while the apparatus is in the stopped condition as the above-mentioned condition, all the remaining output number are allocated equally to the main bodies of the other image forming apparatus.

According to (Structure 12), while the apparatus is in the stopped condition, all the remaining output number are ed equally to the main bodies of the other image forming apparatus to be sent. Therefore, by allocating the remaining output number of the main body of the stopped image forming apparatus to the main bodies of the image forming apparatus which have finished their outputs, after the output of the designated job of the main body of the other image forming apparatus is completed during the abnormal condition, it is possible to obtain the desired numbers of the image copies, without releasing the abnormality of the main body of the image forming apparatus which is in abnormal condition.

(Structure 13) The image forming apparatus stated in either one of the Structures 9–12, wherein there is provided the re-allocation establishing means which switches between the manner to perform the above-mentioned re-allocation establishment and the manner not to perform it.

According to (Structure 13), by switching the manner to perform the re-allocation establishment or the manner not to perform it, it is possible to use the image forming apparatus in accordance with the condition.

BRIEF DESCRIPTION OF THE DRAWINGS

FIGS. 3(*a*) and 3(*b*) show the display panel of the image forming apparatus.

DETAILED DESCRIPTION OF THE PREFERRED EMBODIMENT

The embodiments of the present invention will be explained hereinafter, referring to the drawings.

Figure 1:
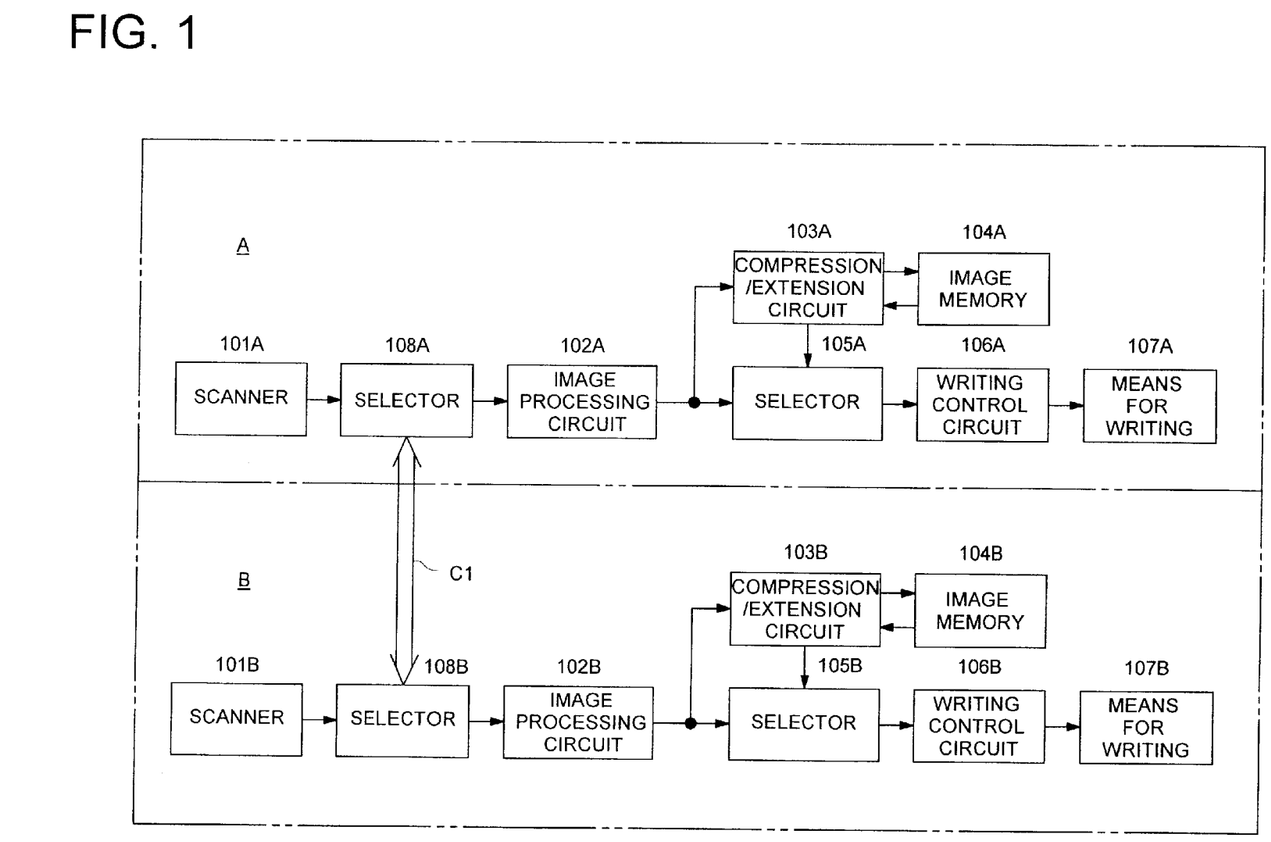
FIG. 1 is a block diagram of the read image data processing system of the image forming apparatus.

FIG. 1 is a block diagram of the image data processing system of the image forming apparatus.

In FIG. 1, two sets of the copying machines representing copying machine A and copying machine B (not limited to two sets, but a plurality of sets can be used) are connected each other in the construction of the tandem type, and constitute the image forming apparatus of the present invention. Further, they are the copying machines which can output the image inputted from the external device such as the personal computer.

FIG. 1 is an example of simultaneous copying carried out by two sets of copying machines representing the first copying machine A and the second copying machine B, and there are shown the block diagrams which show from the reading process to the writing process in the operations of the copying machines A and B. The symbol 101A and the symbol 101B are scanners which output the read image signals, the symbol 102A and the symbol 102B are image processing circuits which process the image process such as variable magnification and the like, and symbol 103A and the symbol 103B are compression/extension circuits of the image data.

The symbol 105A and the symbol 105B are selectors which select whether a direct writing of the image data or a temporary storage of the image data in the memory, the symbol 106A and the symbol 106B are writing control circuits which respectively drive writing means 107A and 107B, and the writing means 107A and the writing means 107B perform the writing to photoconductors by light-emitting elements representing semiconductor lasers.

C1 is a cable which transmit the image data between the copying machine A and the copying machine B, and selector 108A is the one that selects whether to input the image data from the scanner 101A to the image processing circuit 102A or to input the image from the scanner 101B to the image processing circuit 102A. Selector 108B is the one that selects whether to input the image data from the scanner 101A in the image processing circuit 102A or to input the image data from the scanner 101B in the image processing circuit 102B.

As shown in FIG. 4, when a plurality of the copying machines A and B perform the tandem movement to make one hundred sets of copies from ten sheets of the documents, for example, ten sheets of the documents are set on the copying machine A which reads the image, a tandem mode (the mode of performing the tandem movement) is designated on the un-illustrated operation panel, the numeral one hundred as the number of the sets of copies is set, and a copy button is pressed, then, in this case, the image data obtained by the scanner 101A through reading of ten sheets of the documents are stored in both of the image memories 104A and 104B via the selectors 108A and 108B.

Further, the numbers of copying set are, for example, automatically allocated to the copying machine A for fifty sets and the copying machine B for fifty sets, then each copying machine copy them, and as a result, it becomes possible to copy two times faster than the case of the single copying machine.

Figure 2:
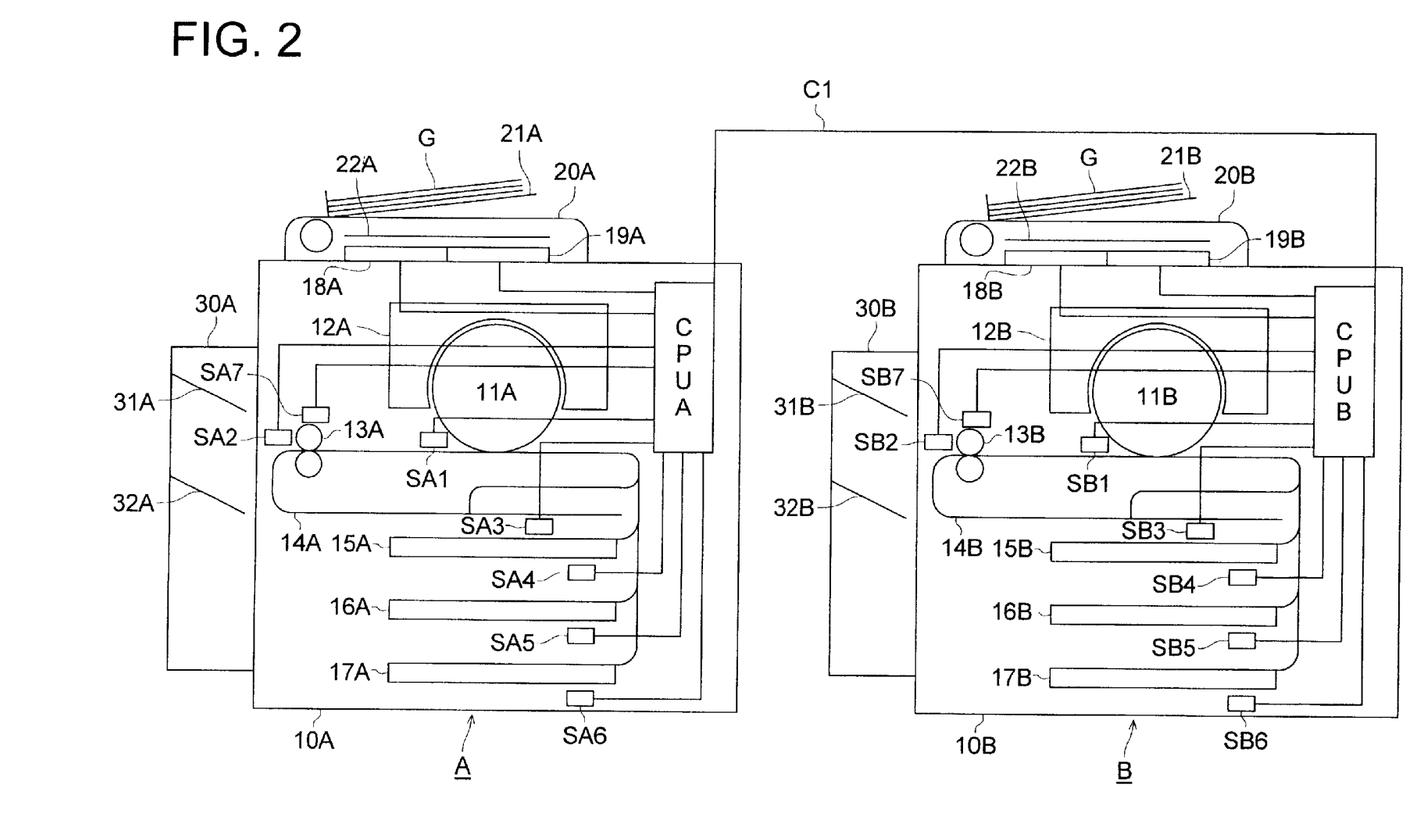
FIG. 2 is a sectional view of the image forming apparatus.

FIG. 2 is a sectional view of the image forming apparatus shown in FIG. 1.

FIG. 2 is sectional views of the copying machine A and the copying machine B both of which can perform the tandem mode, and the copying machine A is provided with an image forming section (image forming means) 10A, an image reading section (image reading means) 20A and a recording materials stacking section 30A, while the copying machine B is provided with image forming section (image forming means) 10B, image reading section (image reading means) 20B and recording materials stacking section 30B.

In the image forming sections 10A and 10B, the symbols 11A and 11B are electrophotographic photoconductors (hereafter referred to as photoconductor), and, image forming sections 12A and 12B are arranged around the photoconductors 11A and 11B. Performing the electrostatic charge, the exposure and the development on the photoconductors 11A and 11B, the image forming sections 12A and 12B form toner images on the surface of the photoconductors 11A and 11B. The image forming sections 12A and 12B have cleaning devices which remove toner remaining on the photoconductors 11A and 11B after the transfer process. The symbols 13A and 13B are fixing units which fix the toner images on the recording materials. The copying machines A and B have sheet feeding sections 15A–17A having therein various sizes of recording sheets and sheet feeding sections 15B–17B, respectively. Further, the copying machines A and B have respectively sheet feeding sections 14A and 14B for duplex image formations which reverse the recording sheets having images formed on their surfaces and supply them again to the image forming sections.

The recording sheet, which is supplied from either one of the sheet feeding sections 15A–17A, is subjected to transfer of the toner image from the photoconductor 11A, and then, it passes through the fixing device 13A to be fixed, and is ejected to the recording material stacking section 30A. In the same way, the recording sheet, which is supplied from either one of the sheet feeding sections 15B–17B, is subjected to transfer of the toner image from the photoconductor 11B, and is fixed to be ejected to the stacking section 30B.

The image reading sections 20A and 20B are the image scanners which have platens 21A and 21B on which the documents G having images to be read are placed, and have ejected sheet stacking sections 22A and 22B on which the image-read documents are stacked.

The stacking sections 30A and 30B have respectively trays 31A and 31B on which the non-bound recording sheets are stacked, and have respectively trays 32A and 32B on which the bound recording materials are stacked.

SA1 and SB1 represent recording sheet detecting sensors which are located at the positions where the recording sheets are separated from the photoconductors 11A and 11B. When the recording sheets jam at the separating positions, SA1 and SB1 output jamming signals. SA2 and SB2 are the sensors which detect the jams of the recording sheets at the fixing units 13A and 13B.

SA4–SA6 and SB4–SB6 are the sensors which detect the existence of the recording materials at the sheet feeding sections 15A–17A, and 15B–17B, respectively. SA3 and SB3 are the sensors which detect the jams of the recording sheets at the sheets feeding sections 14A and 14B of the duplex image formations, respectively.

SA7 and AB7 are the sensors which detect the fixing temperature of the fixing devices 13A and 13B, respectively.

The output of the various sensors from SA1 to SA7 in the copying machine A stated above are inputted in control section CPUA, while the output of the various sensors from SB1 to SB7 in the copying machine B are inputted in control section CPUB.

To the control sections CPUA and CPUB, there are inputted not only the output of the above-mentioned various sensors but also the signals from operation panels 18A and 18B, and the control sections CPUA and CPUB control respectively the contents which are displayed on display sections of display panel 19A and display panel 19B. Further, the control section CPUA and the control section CPUB are connected each other by a cable C1 that transmits control signals.

The copying by the tandem mode of the invention will be explained in detail as follows.

The image forming apparatus, composed of the copying machine A and the copying machine B, being connected in the way of the tandem mode, perform image forming under the following tandem mode, in addition to the independent mode which forms the image independently in each of the image forming sections, based on image data obtained through reading by an image reading section of each copying machine.

Taking a case to make one hundred sets of copies from ten sheets of the documents for example, in the tandem mode, a user sets ten sheets of the documents on the platen 21A of the copying machine A, further, selects the tandem mode on the operation panel 18A, sets the copy quantity of numeral 100, and presses a copy button, then the image data of ten sheets of the documents which are obtained at the image reading section 20A are stored in both of image memory 104A and image memory 104B. Further for example, the copy quantity is automatically allocated to copying machines A and B so that 50 sets may be allotted to each of them, and each of the copying machines performs the copying.

By the operation on the operation panel 18A, there are established the copy quantity, the sizes of the recording sheets in use, the copying magnification, and the selection of single-side copying by which the images are copied on one side of the recording material, or the duplex copying by which the images are copied on both sides of the recording material. The control signals generated by these operations are not only used for the control by the control section CPUA in the copying machine A, but also used for control of the copying machine B by the control section CPUB by being transmitted from cable C1 to the control section CPUB.

During the copying operation in the copying machines A and B, when the recording sheet of the designated size is used up in the sheet feeding sections 15B–17B, the emptiness of the recording sheet is detected by either one of the sensors SB4–SB6, and is transmitted to the control section CPUA via the control section CPUB and the cable C1, and the abnormality is displayed on the display panel 19A.

There are displayed, on the display panel 19A of the copying machine A, not only the emptiness of the recording sheet but also the jam of the recording sheets detected by the sensor SB1 and SB2 in the copying machine B.

Figure 3A:
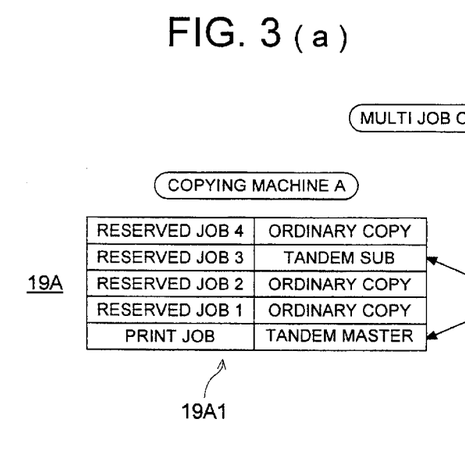
Figure 3B:
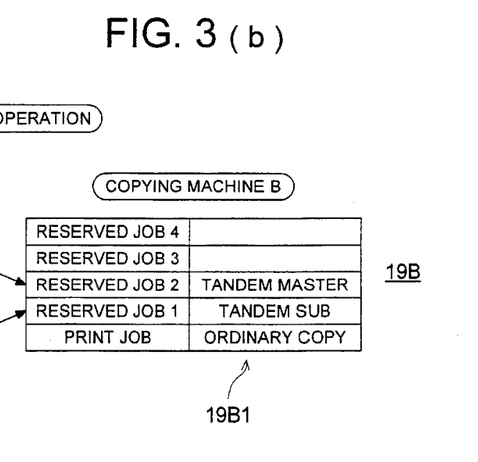

FIGS. 3(a) and 3(b) show a display panel of the image forming apparatus shown in FIG. 2.

FIGS. 3(a) and 3(b) also show job control display sections 19A1 and 19B1 respectively of the display panels 19A and 19B, FIG. 3(a) more specifically shows the job control display section 19A1 of the copying machine A, while FIG. 3(b) more specifically shows the job control display section 19B1 of the copying machine B. For example, FIGS. 3(a) and 3(b) show the following condition.

The copying machine B is on operation of copying for the ordinary copy of the print job of the single mode, and in the course of this job, the copying machine A is set to the tandem mode, and the copying machine A is on operation of copying for the print job as the master machine.

As the copying machine A is set to be the tandem mode to be on copying operation as the print job, the reservation of the tandem job is made on the copying machine B as the sub machine.

During the performance of this job, in the copying machine A and the copying machine B, the reservations of the copies are made in the following procedure by the control means. The control means is constituted with the selectors 108A and 108B, and the control sections CPUA and CPUB.

For the job reservation of the copying machine A, the ordinary copy of the single job as the reservation job 1, and the ordinary copy of the single job as the reservation job 2 are reserved in sequence.

After that, the tandem mode is set on the copying machine B, and the copying machine B becomes the master machine, to reserve the tandem job as the reservation job 2. By this reservation, the copying machine A becomes the sub machine to reserve the tandem job of the reservation job 3.

After that, in the copying machine A, the ordinary copy of the single job as the reservation job 4 is reserved in sequence.

In each of the copying machines A and B, the reservation can be made freely, and the reservation job can be either the tandem type or the single type (ordinary copy).

Figure 6:
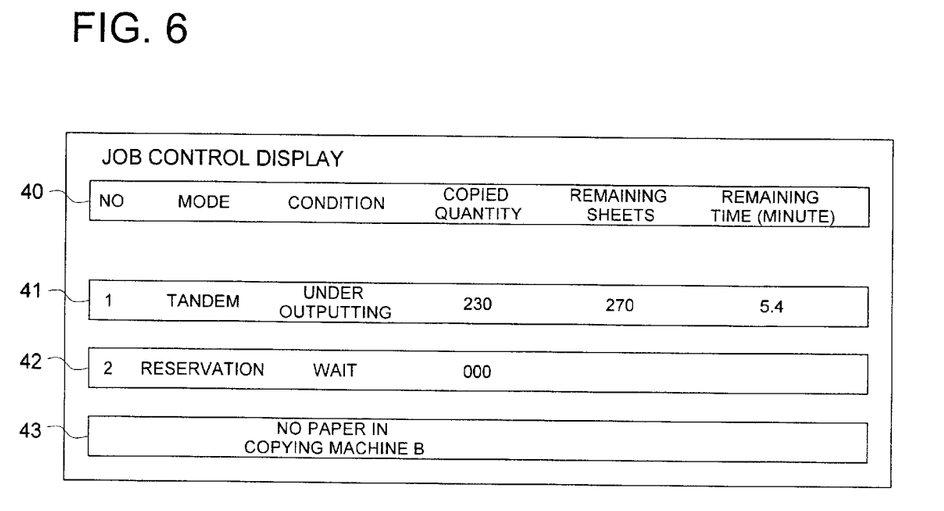
FIG. 6 is a drawing showing the display panel of the image forming apparatus in detail.

FIG. 6 minutely show a display panel of the image forming apparatus shown in FIG. 2.

FIG. 6 show a job control display section of the display panel 19A and 19B. In this display panel, there exist introducing section 40 of the display contents, display section 41 displaying the first priority job, display section 42 displaying the second priority job, and display section 43 displaying the condition of the engaged machine (that is, for the copying machine A, the condition of the copying machine B, and for the copying machine B, the condition of the copying machine A) connected by the cable C1.

For example, FIG. 6 show the following conditions.

The copying machine A is established to the tandem mode, and is on operation of copying, and 230 sheets out of 500 sheets of copies have already been made, and the remaining number of the copies to be made is 270. The time required for making the remaining sheets is 5.4 min. Further, there is reserved next copying which is displayed on the display section 42 as the second priority job.

The copying machine B has no designated sheet in the sheet feeding section.

In the copying machine B, in case of jamming of sheet, "jam" is displayed on the display section 43. Further, "wait" is displayed, as the next job is under the waiting condition.

On each of the copying machine A and the copying machine B, there is provided a control means that transmits the remaining number of output to one set of the copying machine via the cable C1, conducts re-allocation for the remaining number of output on the one copying machine, depending on circumstances, and further performs the re-allocation until all of the remaining output numbers are completely outputted, when the other copying machine has the remaining number of output of the copies, at the end of the job to output from one set of copying machine, based on the allocation of the output number of the copies, and this control means is composed of the selectors 108A and 108B, and the control sections CPUA and CPUB.

The re-allocation is performed for the improvement of the productivity in the tandem mode. When the output of the output number allocated into the one set of the copying machine is completed, while the output of the other copying machine is still in operation, the remaining numbers to be outputted are sent to the one set of the copying machine, and are allocated again by the control means.

According to the condition of the still-working copying machine, the remaining numbers to be outputted are allocated again and are outputted by the operation finished copying machine. There is no limit for the number of times of the re-allocation, that is, the re-allocation will be repeated by the control means until the preset output numbers are completely outputted. The re-allocation is performed by the unit of set copies, and no re-allocation is performed for the set on-the-way of output.

Further, the operation panels 18A and 18B are provided with means for establishing the re-allocation, and by using the means for establishing the re-allocation, it is possible to use in accordance with the conditions by switching the way to perform the re-allocation or not.

The re-allocation operations will be explained as follows.

When one of the copying machines (copying machine F) normally finishes the job (the completion of the output of the allocated job including the re-allocation), the condition of the other copying machine is checked. The re-allocation is performed in accordance with the condition of the subjected job of the other copying machine obtained from the checked results.

Firstly, when the other copying machine is in stopped condition, the copying machine F outputs all the remaining output of the other copying machine. There is a case that the copy quantity of the copying machine which gave all of the copying work becomes "0" setting, however, the job clearing is not performed, and when the start timing of the job comes, the re-allocation is checked, and if there is remaining re-allocated work to be done, the copying machine receives it to output. There is a case that the job of the sub copying machine ends during the data receiving. In case of the copying stopped condition, all of the remaining outputs are allocated to the other copying machine. By doing this, the desired set of copies can be obtained without recovering the abnormal condition of the troubled copying machine, because the remaining outputs of the stopped copying machine are re-allocated to the other copying machine which has finished the output of the designated job, in case of the abnormal condition.

Secondly, when the other copying machine is on the output operation, the copying machine F receives the re-allocation of a half of the remaining outputs and outputs them. Fractions are to be cut away. In case of raising to a unit for fractions, the re-allocation is performed even though the remaining output is "1 set", resulting in decrease of productivity, on the contrary. When the other copying machine is on the output operation, it is possible to obtain the output results within the shortest time, by allocating the remaining output set numbers to a plurality of the copying machines equally.

Thirdly, when the other copying machine is in the disable condition of the service person calling trouble, the copying machine F receives all of the remaining output and outputs them. That is, while the disable condition of the copying machine, by allocating all of the remaining output to the other copying machine, all the assigned output can be obtained, even if the service person calling error happens, after the abnormal condition happened.

As described above, when the outputting job of the one copying machine is finished, if there are the remaining output numbers in the other copying machine, re-allocation of the output number of the copies is conducted in accordance with the conditions, and the re-allocation is conducted until all of the remaining output numbers are completely outputted. By doing this, the output results can be obtained in the shortest time in accordance with the condition, the productivity is improved and the reliability can also be improved.

The system realizes that well-balanced control is performed complementarily and independently, without the substantial distinction of the main copying machine and the sub copying machine, when a plurality of the copying machines independently receive the job reservation and perform the printing process independently, based on the reserved job including the tandem movement.

For example, when the control is performed only by the main copying machine as in the conventional system, the trouble of the main copying machine makes it impossible to control the re-allocation.

According to the system of the invention, with a signal of the job end of each copying machine itself, each copying machine conducts checking of the job end of the other machine and conduct the routine of the re-allocation, in consequence, there is no influence of the above-mentioned trouble.

Further, the re-allocation can be performed repeatedly by the routine stated above. In consequence, it becomes possible to obtain the higher printing speed of the total system.

What is claimed is:

1. An image forming system for connecting a plurality of image forming apparatus and conducting a tandem operation such that an image input by one of the plurality of image forming apparatus is output by the plurality of image forming apparatus, the system comprising:
    job reserving sections provided on each of the plurality of image forming apparatus, for reserving a plurality of image forming jobs,
    wherein while conducting said tandem operation, any of the job reserving sections on each of the plurality of image forming apparatus is capable of reserving an image forming job.

2. The image forming system of claim 1, wherein each of the plurality of image forming apparatus comprises a memory for storing a reserved job set by any of the job reserving sections, and
    wherein each of the job reserving sections is capable of independently and sequentially storing each reserved job into the memory.

3. The image forming system of claim 2, wherein the reserved job is administered commonly in the memory.

4. An image forming system of claim 1, wherein each of the plurality of image forming apparatus comprises an allocating section for allocating a set number of output images while conducting the tandem operation, and
    wherein, when any of the plurality of image forming apparatus finishes a job of the tandem operation, the image forming apparatus independently checks if a job of tandem operation is finished in the other image forming apparatus, and allocates with said allocating section.

5. An image forming system of claim 4, wherein, if the job of tandem operation is not finished, each of the plurality of image forming apparatus transmits a residual output set number to an image forming apparatus where the job of tandem operation is finished, and the image forming apparatus, where said job is finished, reallocates output set numbers based on the transmitted residual output set numbers, and each of the plurality of image forming apparatus in the image forming system repeats the above operation until all of the residual output sets are outputted.

6. An image forming system of claim 1, wherein the plurality of image forming apparatus are connected via a network, and capable of mutually communicating image data and job information.

7. An image forming system for connecting a plurality of image forming apparatus and conducting a tandem operation such that an image input by one of the plurality of image forming apparatus is output by the plurality of image forming apparatus, the system comprising:
    job reserving sections provided on each of the plurality of image forming apparatus, for reserving a plurality of image forming jobs,
    wherein, the job reserving sections are capable of reserving both of a job outputting images by a single operation of a single image forming apparatus, and a job outputting images by the tandem operation.

8. The image forming system of claim 7, wherein each of the plurality of image forming apparatus comprises a memory for storing a reserved job set by any of the job reserving sections, and
    wherein each of the job reserving sections is capable of independently and sequentially storing the reserved job into the memory.

9. An image forming system of claim 8, wherein a reserved job of the tandem operation and a reserved job of the single operation are administered commonly in said memory.

10. The image forming system of claim 7, wherein while performing the tandem operation, any of the job reserving sections on the plurality of image forming apparatus is capable of reserving an image forming job.

11. The image forming system of claim 7, wherein, while conducting a job of outputting images by a single operation of a single image forming apparatus, a reservation of an image forming job is possible.

12. An image forming system of claim 7, wherein the plurality of image forming apparatus are connected via a network, and capable of mutually communicating image data and job information.

13. An image forming system for connecting a plurality of image forming apparatus and conducting a tandem operation such that a series of images input by one of the plurality of image forming apparatus is output by the plurality of image forming apparatus to share a quantity of output sets of the series of images, the system comprising:
    job reserving sections provided on each of the plurality of image forming apparatus, for reserving a plurality of image forming jobs,
    wherein, while a certain image forming apparatus in said plurality of image forming apparatus is performing an image outputting job with a single operation of a single image forming apparatus, said certain image forming apparatus is capable of reserving a job of the tandem operation with a reserving section of the other image forming apparatus.

14. An image forming system of claim 13, wherein said plurality of image forming apparatus are connected via a network, and capable of mutually communicating image data and job information.

15. The image forming system of claim 13, wherein each of the plurality of image forming apparatus comprises a memory for storing a reserved job set by any of the job reserving sections, and wherein each of the job reserving sections is capable of independently and sequentially storing the reserved job into the memory.

16. The image forming system of claim 15, wherein the reserved job is administered commonly in the memory.

17. An image forming apparatus for connecting with other image forming apparatus and conducting a tandem operation such that an input image is output by a plurality of image forming apparatus, the apparatus comprising:

a job reserving section for reserving a plurality of image forming jobs, wherein, while performing the tandem operation, the job reserving section is always capable of reserving an image forming job.

18. An image forming apparatus of claim 17, wherein the job reserving section accepts a job reservation even while conducting the tandem operation based on an image inputted by the other image forming apparatus.

19. An image forming apparatus of claim 17, further comprising a memory for storing a reserved job set by the job reserving section, wherein the job reserving section is capable of independently and sequentially storing the reserved job into the memory.

20. The image forming apparatus of claim 19, wherein the reserved job is administered commonly in said memory.

21. An image forming apparatus of claim 17, wherein, the job reserving section is capable of reserving both of a job outputting images with a plurality of the image forming apparatus, and a job outputting images with a single image forming apparatus.

22. An image forming apparatus of claim 17, wherein the image forming apparatus is a copying machine or a printer, and the job is capable of setting an output by any of the copying machine or the printer.

23. An image forming apparatus of claim 17, further comprising an allocating section for allocating a set number of output images while conducting the tandem operation, and wherein, every time when the image forming apparatus finishes a job of the tandem operation, the allocating section checks if a corresponding job of the tandem operation is finished in the other image forming apparatus, and reallocates a job based on the checking result.

24. An image forming apparatus of claim 23, wherein when the other image forming apparatus is conducting an output operation, the allocating section allocates a residual output set numbers equally to the image forming apparatus.

25. An image forming apparatus of claim 23, wherein when the other image forming apparatus is inoperable or stopping condition, the allocating section allocates all the residual output sets to the operable image forming apparatus.

26. The image forming apparatus of claim 23, further comprising a reallocating setting section for selecting a setting to conduct a reallocation or a setting not to conduct the reallocation.

27. An image forming apparatus of claim 17, wherein the image forming apparatus is connected to the other image forming apparatus via a network, and capable of mutually communicating image data and job information.

28. An image forming apparatus for connecting a plurality of image forming apparatus and being capable of conducting a tandem operation such that a series of images input by one of the plurality of image forming apparatus is output by the plurality of image forming apparatus to share a quantity of output sets of the series of images, the apparatus comprising:

a job reserving section for reserving a plurality of image forming jobs, wherein, the job reserving section is capable of reserving both of a job outputting images by a single operation of a single image forming apparatus, and a job outputting images by the tandem operation.

29. An image forming apparatus of claim 28, further comprising a memory for storing a reserved job set by the job reserving section, wherein the job reserving section is capable of independently and sequentially storing the reserved job into the memory.

30. An image forming apparatus of claim 29, wherein a reserved job of the tandem operation and a reserved job of the single operation are administered commonly in the memory.

31. An image forming apparatus of claim 28, wherein, while conducting a job of outputting images by a single operation of a single image forming apparatus, a reservation of the image forming job is possible.

32. An image forming apparatus of claim 28, wherein the job reserving section accepts a job reservation even while conducting the tandem operation.

33. An image forming apparatus of claim 28, wherein the image forming apparatus is a copying machine or a printer, and the job is capable of setting an output by any of the copying machine or the printer.

34. An image forming apparatus of claim 28, wherein the image forming apparatus is connected to the other image forming apparatus via a network, and capable of mutually communicating image data and job information.

35. An image forming apparatus for connecting with other image forming apparatus and conducting a tandem operation such that an input image is output by a plurality of image forming apparatus, the apparatus comprising:

a job reserving section for reserving a plurality of image forming jobs, wherein while conducting a job outputting images by a single operation of a single image forming apparatus, reserving a job of the tandem operation by the reserving section of the other image forming apparatus is possible.

36. An image forming apparatus of claim 35, wherein the image forming apparatus is connected to the other image forming apparatus via a network, and capable of mutually communication image data and job information.

37. Am image forming apparatus of claim 35, further comprising a memory for storing a reserved job set by the job reserving section, wherein the job reserving section is capable of independently and sequentially storing the reserved job into the memory.

38. The image forming apparatus of claim 37, wherein the reserved job is administered commonly in the memory.

* * * * *